(12) United States Patent
Turvey et al.

(10) Patent No.: US 9,296,541 B2
(45) Date of Patent: Mar. 29, 2016

(54) VACUUM VALVE AND COMPRESSION STORAGE BAGS INCLUDING THE VALVE

(71) Applicant: S.C. Johnson & Son, Inc., Racine, WI (US)

(72) Inventors: Robert R. Turvey, Sanford, MI (US); John O. McCree, Bay City, MI (US)

(73) Assignee: S. C. Johnson & Son, Inc., Racine, WI (US)

( * ) Notice: Subject to any disclaimer, the term of this patent is extended or adjusted under 35 U.S.C. 154(b) by 33 days.

(21) Appl. No.: 14/223,633

(22) Filed: Mar. 24, 2014

(65) Prior Publication Data

US 2015/0266648 A1    Sep. 24, 2015

(51) Int. Cl.
*B65D 33/01* (2006.01)
*B65D 81/20* (2006.01)
*F16K 7/17* (2006.01)

(52) U.S. Cl.
CPC ........ *B65D 81/2023* (2013.01); *B65D 81/2038* (2013.01); *F16K 7/17* (2013.01); *Y02W 90/12* (2015.05); *Y10T 137/7879* (2015.04)

(58) Field of Classification Search
CPC ............... B65D 33/01; B65D 81/2038; B65D 33/2508; Y10T 137/7879; Y10T 137/7895; F16K 15/144
USPC ........................... 383/100, 103; 137/843, 859
See application file for complete search history.

(56) References Cited

U.S. PATENT DOCUMENTS

| | | |
|---|---|---|
| 2,778,171 A | 1/1957 | Taunton |
| 3,149,772 A | 9/1964 | Olsson |
| 5,332,095 A | 7/1994 | Wu |
| 5,450,963 A | 9/1995 | Carson |
| 5,480,030 A | 1/1996 | Sweeney et al. |
| 5,554,423 A | 9/1996 | Abate |
| 5,931,189 A | 8/1999 | Sweeney et al. |
| 5,996,800 A | 12/1999 | Pratt |
| 6,070,728 A | 6/2000 | Overby et al. |
| 6,089,271 A | 7/2000 | Tani |
| 6,408,872 B1 | 6/2002 | Skeens et al. |
| 6,837,268 B2 | 1/2005 | Skeens et al. |
| 6,984,278 B2 | 1/2006 | Anderson et al. |
| 7,048,136 B2 | 5/2006 | Havens et al. |
| 7,055,794 B1 | 6/2006 | Tang |
| 7,178,555 B2 * | 2/2007 | Engel et al. .................. 137/852 |
| 7,244,223 B2 * | 7/2007 | Hartman et al. .............. 493/213 |
| 7,290,660 B2 | 11/2007 | Tilman et al. |
| 7,305,742 B2 | 12/2007 | Anderson |
| 7,350,541 B2 | 4/2008 | Kobetsky |
| 7,357,276 B2 | 4/2008 | Savage et al. |
| 7,399,263 B2 * | 7/2008 | Hartman et al. .............. 493/213 |

(Continued)

*Primary Examiner* — Jes F Pascua

(57) ABSTRACT

Valves useful in vacuum compression storage bags are described. The valve includes a check valve, a carrier film having adhesive on a surface thereof, and a plastic stand-off with projecting protrusions. The check valve, carrier film and stand-off each have an opening therethrough which when affixed together align to provide a passageway through the valve. When used with a vacuum compression storage bag, the valve is aligned with a hole through a wall of the bag to provide an air flow passageway through the aligned holes from the interior of the bag through the valve when vacuum force is applied over the valve and the bag sealed. The stand-off extends inside the bag to prevent contents therein from blocking air flow from inside the bag through the valve during vacuum evacuation of air from the bag. The stand-off has a rigidity to prevent collapse of the valve under vacuum force.

11 Claims, 2 Drawing Sheets

(56) References Cited

U.S. PATENT DOCUMENTS

| | | |
|---|---|---|
| 7,422,369 B2 | 9/2008 | Bergman |
| 7,438,473 B2 | 10/2008 | Borchardt |
| 7,475,864 B2 | 1/2009 | Tanaka |
| 7,513,481 B2 | 4/2009 | Su |
| 7,578,320 B2 | 8/2009 | Borchardt |
| 7,596,930 B2 * | 10/2009 | Borchardt ................ 53/434 |
| 7,614,430 B2 | 11/2009 | Bergman et al. |
| 7,726,880 B2 * | 6/2010 | Zimmerman et al. ....... 383/103 |
| 7,798,714 B2 * | 9/2010 | Zimmerman et al. ....... 383/103 |
| 8,197,138 B2 * | 6/2012 | Turvey ................. 383/103 |
| 2005/0190995 A1 * | 9/2005 | Koyanagi ................ 383/103 |
| 2006/0280389 A1 | 12/2006 | Zimmerman et al. |
| 2007/0241023 A1 * | 10/2007 | Ootsubo et al. .......... 206/524.8 |
| 2008/0118190 A1 | 5/2008 | Tang |
| 2008/0256901 A1 | 10/2008 | Custer et al. |
| 2008/0310776 A1 | 12/2008 | Turvey et al. |
| 2009/0052809 A1 | 2/2009 | Sampson |
| 2009/0169693 A1 * | 7/2009 | Hoffman ................ 426/395 |
| 2009/0257688 A1 | 10/2009 | Calvo et al. |
| 2010/0040310 A1 * | 2/2010 | Turvey ................. 383/103 |
| 2011/0216990 A1 * | 9/2011 | Lin .................... 383/103 |
| 2012/0099806 A1 | 4/2012 | Turvey et al. |
| 2013/0048125 A1 * | 2/2013 | Hoffman ............. F16K 15/144 137/852 |

* cited by examiner

VACUUM VALVE AND COMPRESSION STORAGE BAGS INCLUDING THE VALVE

FIELD OF INVENTION

The present invention relates to valves for and in combination with vacuum compression storage bags. More specifically, the invention is directed to a flexible compact valve for affixing to a vacuum compression storage bag for clothing and other items, wherein the valve includes a stand-off for optimizing the air flow and evacuation of air from the bag.

BACKGROUND OF THE INVENTION

Vacuum compression storage bags are known in the art. For example, SPACE BAG® brand vacuum compression storage bags are commercially available for storage of clothing and other items. Such storage bags can be flat bags including a first side wall panel and a second side wall panel which side wall panels are sealed at the side edges and the bottom edge of each other forming a bag having an open top as shown in FIG. 1. These bags further include a re-closable closure mechanism near the top portion of the bag for opening and closing the bag as illustrated in FIG. 2. Compression storage bags can also be in the configuration of a 3-dimensional rectangle or square with a cover which can be sealed to side walls by a zipper or other re-closable sealing means, such as illustrated in FIG. 3. The bags further include a valve for releasing air from the interior of the storage bag after the bag is filled with the material to be stored such as disclosed, for example, in U.S. Pat. No. 6,408,872. The valve is positioned in a hole 22 formed in a wall of the storage bag. Air is removed from the bag by placing a pump or vacuum hose over the valve to remove the air. One shortcoming of such large vacuum compression storage bags for clothing and other items is the need to use a rather large and complex injection molded valve. Such valves are bulky and non-flexible, as well as increase the cost of manufacture of the bag and the corresponding cost to the consumer. The complexity of the valve is often necessary in order to obtain the removal of substantially all of the air in the bag or to be sturdy enough to handle the applied vacuum force. The valve may include rigid legs or protrusions to prevent the valve from contacting the opposing wall of the bag or items, e.g. clothing, stored in the bag to avoid inhibiting the air flow and removal of the air from the bag.

While the current vacuum compression storage bags may be useful in storing clothing or other items, there is room for improvement, including providing a valve and a vacuum compression storage bag including such valve wherein the valve is a simple valve with stand-off and is small and flexible allowing for easy and compact packaging and storage of new bag(s). Such valve is also beneficial as being inexpensive to manufacture while providing for substantially complete evacuation of air from the storage bag.

SUMMARY OF INVENTION

The present invention is directed to valves suitable for use in vacuum compression storage bags for clothing and other items, and the combination of the valves with such storage bags, wherein the valves are simple and inexpensive to manufacture. The valves are compact and flexible including a stand-off to allow for evacuation of air from a storage bag to which it is attached after the bag has been closed with the item(s) to be stored therein. The bags can be made as a flat bag having a first side wall, a second side wall and a bottom portion which form a two walled bag and has an open top portion for receiving and removing items to be stored, such as clothing, blankets or other items. The bag further includes a closure mechanism near the open top of the bag, such as a zipper closure, which provides for a re-closable bag. The bag can also have a 3-dimensional shape including a bottom wall, four side walls and a top wall to provide a rectangular or square "block" configuration. The top wall may be attached on one side to a side wall with a closure mechanism, such as a zipper, to attach the other three edges of the top wall to the other side walls. The bag includes a one-way valve for evacuation of air from the bag after the material to be stored has been placed in the bag and the closure mechanism closed. The air is evacuated using a pump or vacuum hose (attached to a suitable source of vacuum) placed over the valve. The present invention provides for an improved valve with stand-off which is compact and flexible, allows for air flow and evacuation of air from the bag, and requires less packaging which, accordingly, requires less shelf space for display in a store or storage in a user's home.

The improved valve with stand-off of the present invention is made from a plastic material such as polyethylene, polypropylene or other thermoplastic material. The valve includes a check valve (e.g. a label-type check valve) with an opening therethrough and an adhesive on an underside surface thereof, a center carrier film with an opening therethrough, and a plastic stand-off having a plurality of protrusions, preferably in the form of ribs, projecting from an underside thereof and including an opening therethrough. The plastic stand-off has a degree of rigidity greater than the check valve or carrier film which is provided by being constructed by extrusion, embossing, cast forming or the like. The degree of rigidity provided to the plastic stand-off can be provided based on various combinations of the stand-off's physical structure, plastic material from which it is made and process of formation, and is such that the rigidity prevents collapse or deformation of the stand-off and, thus the valve, under the force of vacuum pressure applied to the valve. The center carrier film is coated on an exterior surface thereof with an adhesive, wherein at least a portion of the adhesive is on an underside surface of the carrier film. The plastic stand-off is cut from a plastic tape or strip to form the stand-off.

The valve is provided by affixing the underside of the check valve to the topside surface of the carrier film, and affixing the topside surface of the plastic stand-off to the underside surface of the carrier film. The openings in the check valve, carrier film and stand-off are all aligned in the constructed valve and in use are also aligned with an opening in a wall of a compression storage bag. The carrier film is sized, and the adhesive on the exterior surface of the carrier film extends thereon, so that the carrier film will affix over the hole in the storage bag and extend onto an adjacent wall portion of the bag surrounding the hole where the adhesive serves to affix the valve to the wall of the bag and thereby hold the valve in place with respect to the bag. Adhesive on the exterior surface of the carrier film, thus serves the function of affixing the plastic stand-off with protrusions to the carrier film in formation of the valve, as well as hold the valve in place with respect to the storage bag. By this structure, the stand-off with projecting protrusions extends in use through the hole in the wall of the compression bag and into the interior space of the bag.

The valve may be formed by a variety of geometries, i.e., circular, rectangular, square, triangular, etc., with circular being preferred. The stand-off must be of sufficient length and width to have the stand-off protrusions extend inwardly through the hole in the bag wall into the interior storage portion of the bag so that when a pump or vacuum hose is placed over the valve to evacuate air, the protrusions of the standoff will maintain space between the bag wall to which the valve is adhered and the contents of the bag to thereby provide for air flow and evacuation of air from the bag through the aligned holes of the bag and valve.

An advantage of the plastic stand-off with protrusions being provided by extrusion, embossing, cast forming and the like is that it has sufficient rigidity to allow for air flow and not collapsing or deforming while also based on its compact size not interfering with the flexibility of the overall valve structure. The combined valve structure allows the valve to be smaller, in terms of area (width×length) and depth (thickness), so as not to interfere with packaging of the bag for display and storage purposes thereby allowing for more compact packaging as compared to currently marketed storage bags. The rigidity of the plastic stand-off due to being extruded, embossed, cast formed or the like provides strength to maintain an air passageway up to and through the opening passageway in the valve to accomplish the desired air evacuation of the storage bag and, thereby, compression of the bag.

BRIEF DESCRIPTION OF THE DRAWINGS

The following detailed description of specific non-limiting embodiments of the present invention can be best understood when read in conjunction with the following drawings, where like structures are indicated with like reference numbers.

DETAILED DESCRIPTION OF THE PREFERRED EMBODIMENTS

The present invention is directed to valves and the valves in combination with vacuum compression storage bags. The valves are simple and inexpensive to manufacture and are advantageously flexible and compact in structure while providing for good air flow during evacuation of air from a vacuum compression storage bag to which it is affixed in use. The valve includes a stand-off, including projecting protrusions (for example, ribs), which provides for efficient evacuation of air from a vacuum compression storage bag after the bag is filled with items, e.g. clothing, blankets and other material, to be stored and closed.

Figure 1:
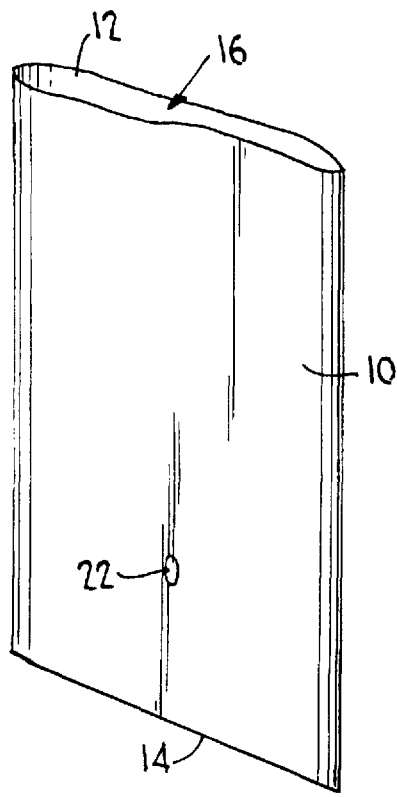
FIG. 1 is a side perspective view of an open-top flat vacuum compression storage bag having a hole in one side wall thereof for receiving an air evacuation valve.
Figure 2:
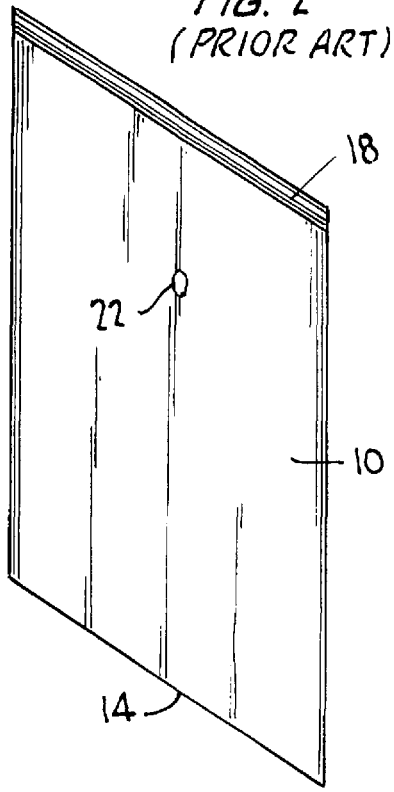
FIG. 2 is a side view of a two sided bag similar to that shown in FIG. 1 except for having a reusable closure along the top opening thereof.
Figure 3:
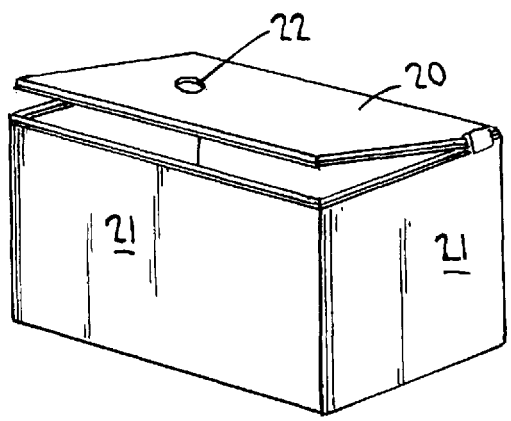
FIG. 3 is a perspective view of a storage bag having a 3-dimensional rectangular shape when in a non-compressed state. A hole is shown in the top wall of the bag for receiving an air evacuation valve.

Referring generally to FIGS. 1-3, flat vacuum compression storage bags, e.g. in a range of about 18 inches by about 20 inches to about 35 inches to about 48 inches, include a first side wall 10, a second side wall 12 and a bottom portion 14 which forms the bag and having an open top portion 16 for receiving and removing items to be stored, such as clothing, blankets or other items. The side walls and bottom wall are sealed using known sealing techniques such as heat sealing. The bag may be made of polyethylene, polypropylene, nylon, bioplastics or like materials. The bag further includes a closure mechanism 18 near the top of the bag, such as for example a zipper closure, which provides for a re-closable bag. Zipper closures and other suitable closures are known in the art. Such storage bags may include ribs (not shown) on the inside of each side wall for gripping to aid in opening of the bag, although these are not necessary to a good storage bag.

Suitable vacuum compression storage bags may also have a 3-dimensional rectangular or square configuration such as shown in FIG. 3. Such bags include four side walls 21, a bottom wall and a top wall or cover 20. The cover 20 along one edge may extend from and be integral with one side wall and be open along the other three edges to allow the cover 20 to be lifted to provide an opening to fill the bag with item(s) to be stored. A reclosable closure mechanism, such as a zipper, can be provided along these three edges of the cover and a complementary portion attached to the approximate top area of the adjacent three side walls to provide closure and sealing of the cover to the side walls.

Figure 4:
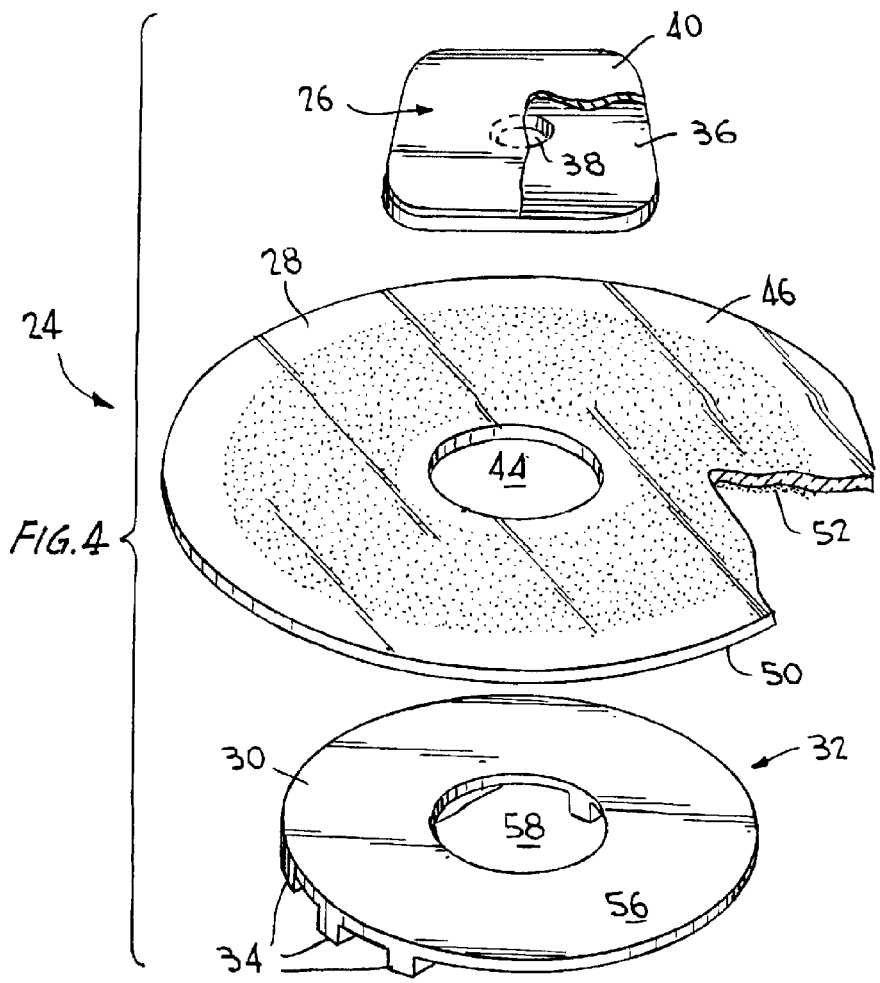
FIG. 4 is an exploded perspective view of a valve of the present invention.
Figure 5:
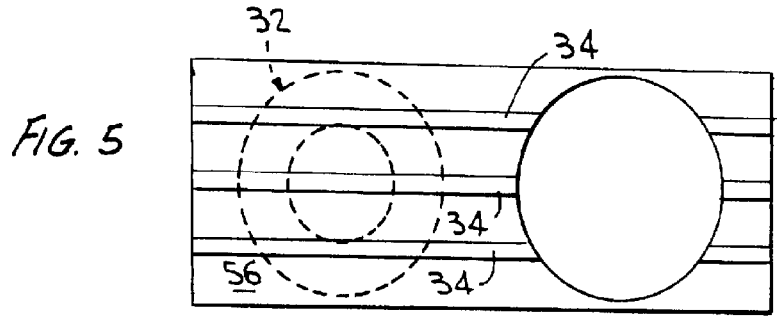
FIG. 5 is an underside view of a plastic tape or strip having one stand-off with protrusions in the form of ribs projecting therefrom cut from the tape and one stand-off to be cut therefrom.
Figure 6:
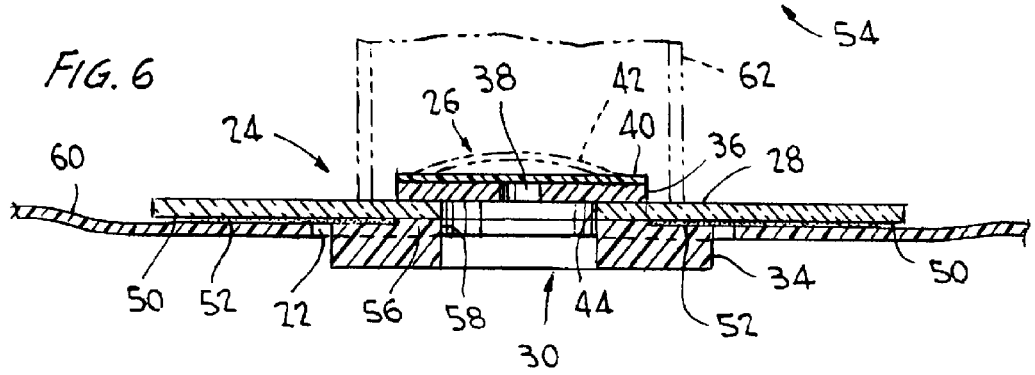
FIG. 6 is a side cross-sectional view of a valve of the invention positioned for use in a hole in a wall panel of a vacuum compression storage bag.

The storage bags of desired configuration will include a hole 22 for receiving a valve for providing evacuation of air from the bag. A valve advantageously suitable for this use is the valve of the invention as shown in FIGS. 4-6 and described below.

The valve of the invention is structured to be compact, especially in depth or thickness, to provide the valve with flexibility to allow for the use of minimal packaging for display and storage purposes. As shown in FIGS. 4-6, the valve 24 includes an adhesive check valve, preferably a label-type check valve 26, a center carrier film 28, and a stand-off 30 having a planar or flat portion 56 with protrusions, shown in the form of ribs 34, projecting from an underside thereof.

The label-type check valve 26 is made of a flexible plastic, such as polyethylene or polypropylene, and includes a base layer 36 with a hole 38 therethrough, a top layer 40 covering hole 38 during non-use and due to its flexibility is able to be raised (shown in dotted lines 42 in FIG. 6) when a vacuum force is applied to the valve. The top layer 40 is preferably only affixed to base layer 36 on two ends so that when the top layer is raised openings are provided along the side edges to provide air flow communication with hole 38 and the exterior of the valve. The underside of the base layer 36 has an adhesive thereon.

The center carrier film 38 is also formed of a flexible plastic, preferably polypropylene or polyethylene, and has a hole 44 therethrough. The valve 24 is structured having label-type valve 26 affixed to the top surface 46 of carrier film 28. The underside surface 50 includes an adhesive 52 thereon. In FIG. 4, the adhesive 52 is illustrated by the cross-hatching and is visible from the top since the carrier film as illustrated is made of transparent plastic.

The stand-off 30 is comprised of plastic having a degree of rigidity sufficient to prevent collapse or deformation thereof, and thus of the valve, under pressure which is applied to the valve in use. The rigid nature of the stand-off is provided by various combinations of the physical structure and material composition of the stand-off. The stand-off is composed of a plastic such as polyethylene, polypropylene, nylon, bioplastic and the like, and is formed by extrusion, cast forming, embossing or the like. The stand-off's physical structure includes an essentially planar or flat portion 56 with protrusions, preferably in the form of ribs 34, projecting from an underside surface thereof. The stand-off is provided by die cutting a desired configuration from a plastic tape or strip 54. Tape or strip 54 is an integral extruded, embossed, cast formed or the like plastic structure including the flat portion 56 and ribs 34 projecting outward from one side of the flat portion 56. Stand-off 30 is also provided with an opening 58 therethrough. When opening 58 is provided in stand-off 30, the flat portion as well as the ribs present in the space that becomes hole 58 are removed. FIG. 5 shows a plastic tape or strip 54 wherein the right side illustrates where a stand-off has been cut from structure 54 and the left side shows in dotted lines where a stand-off is to be cut therefrom. The top surface of flat portion 56 to form valve 24 will be adhered to the underside 50 of center carrier film 28 so that holes 38, 44 and 58 are all aligned to an extent to provide a continuous air passageway through the valve 24. It is noted that while stand-off 30 is shown having protrusions in the form of three ribs 34, 2 or more ribs spaced apart may be used depending on the overall size of the valve used. Further, the protrusions may be provided in other formations so long as the protrusions are present in a shape or shapes and number which are sufficient to maintain air flow between the interior of the storage bag and into valve 24.

The rigidity of the stand-off is such that it prevents the stand-off from collapsing or deforming when vacuum pressure or force is applied to the valve during evacuation of air through the valve. The typical vacuum force which will be applied to the valve will be provided by a conventional household vacuum cleaner. Conventional household vacuum cleaners, depending on the size of the apparatus and motor therein can have a force of usually up to about 5 psi, generally about 0.5 to about 5 psi, preferably about 2 to about 5 psi. An average vacuum force of conventional household vacuum cleaners is about 2.5 to about 3.0 psi. A manual pump (hand or foot operated) providing a vacuum force for evacuating air would fall within this range also, the difference being a conventional household motorized vacuum would provide a continuous vacuum force on application whereas a manual pump would apply force based on the intake compression. It is noted, however, that the valve can be provided with a rigidity to withstand a higher vacuum force than that of a conventional household vacuum cleaner and remain within the scope of the invention. For example a stronger vacuum force may be provided and the valve can be structured to withstand collapse under such stronger force. A preferred valve will therefore have a rigidity to prevent collapse or deformation thereof under a vacuum force of up to at least about 5 psi.

In use, valve 24 is preferably seated over a hole 22 present in a wall 60 of a vacuum compression storage bag so that hole 22 is aligned with holes 38, 44, and 58 in valve 24 as shown in FIG. 6 to provide a continuous passageway through the holes. Center carrier film 28 is of a width and length to cover the hole 22 and extend over an adjacent portion of the wall 60 of the bag. The adhesive coating 52 on the underside surface 50 of the carrier film in the preferred embodiment extends so as to also extend over a portion of the adjacent wall 60 of the bag. This adhesive serves then to affix the valve 24 to the wall 60 of the bag as shown in FIG. 6. When affixed to wall 60 and the bag is filled with item(s) to be stored thereon, a pump or vacuum hose 62 (shown generally in dotted lines in FIG. 6) is positioned over the valve and in contact with wall 60 to evacuate air from the interior of the bag through the passageway provided by aligned holes 38, 44, 58 and 22, and side openings in valve 26 when top layer 42 rises in response to the vacuum force applied by a pump or vacuum hose 62. In an alternative embodiment, adhesive 52 can be in part on the underside surface 50 so as to affix stand-off 30 thereto and in part on the topside surface 46 of carrier film 28, and valve 24 then affixed by means of adhesive on the topside surface of the carrier film to the interior surface of wall 60 of the storage bag. Check valve 26 would have to be sized and configured to extend through hole 22. The embodiment shown in FIG. 6 with valve 24 adhesively affixed to the exterior of wall 60 is preferred as having greater strength against the vacuum force applied to the valve structure.

The check valve 26 and center carrier film 28 are made of plastic and have a thickness that allows for flexibility to the extent of being bendable. The thickness of the check valve 26 is in a range of about 0.008" (inches) to about 0.030", preferably about 0.006" to about 0.020". The thickness of the carrier film is in a range of about 0.003" to about 0.020", preferably about 0.006" to about 0.016". The stand-off 30 is made of plastic, preferably as set forth above, by extrusion embossing, cast forming or the like. The stand-off therefore has a certain rigidity, as also described above, which provides strength to the valve 24 when vacuum force is applied to the valve so that the structure of the valve 24 maintains its integrity (does not collapse) and so that the protrusions of the stand-off prevent the contents of the storage bag from cutting off the air flow from the interior of the storage bag through valve 24 by maintaining space between hole 58 and the bag contents to allow for flow of air therein. The overall thickness of the stand-off, i.e., including the flat portion 56 and the length of protrusions (ribs 34) is in a range of about 0.100" to 0.200", preferably about 0.140" to about 0.160". Preferably the protrusions (ribs 34) extend beyond the interior side of wall 60 by a length in a range of about 0.90" to about 0.160", preferably about 0.125" to about 0.150".

The geometric configuration of the valve and components thereof can vary, for example such can be of a rectangular, square, circular, triangular or the like shape. A circular configuration is preferred. The size of valve 24 in terms of area (width×length) in part is determined by the size of the hole 22 in a storage bag over which the valve 24 is to be positioned. As the size of the vacuum compression storage bag is increased, the size of the openings in the bag wall and valve may be increased to increase the size of the passageway for air flow to make evacuation of air from the interior of the storage bag more efficient. Valves 24 generally will have an area in a range of about 1 in$^2$ to about 7.0 in$^2$ and will be selected based on the corresponding opening over which it is to be positioned in use, in particular so that carrier film 28 and adhesive 52 applied to a surface thereof extends over wall surface adjacent the hole 22 to securely affix valve 24 to the wall surface 60. Further, when valve 24 is affixed to the exterior of wall 60, stand-off 30 is of a size to project into hole 22 in wall 60 so that ribs 34 extend a desired distance into the interior of the storage bag.

As seen above, a valve suitable for use with a vacuum force which is compact and flexible in structure for a vacuum compression storage bag can be simple and inexpensive while providing for improved air flow in evacuating air from the vacuum compression storage bag is provided by the present invention.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. For example, while the invention has been disclosed in relation to large storage bags, it may be useful in smaller vacuum compression storage bags. Such modifications being within the ability of one skilled in the art form a part of the present invention and are embraced by the appended claims.

We claim:

1. A portable container for storing articles comprising
   a. a compression storage bag including (i) at least two flexible wall panels, wherein one wall panel of said at least two flexible wall panels has a hole formed therethrough for receiving a valve, (ii) an interior access opening and (iii) a closure mechanism for closing said interior access opening; and
   b. a vacuum evacuation valve including (i) a check valve comprising a substantially flat body with a hole therethrough, said body having a top surface with a flexible cover member movably attached thereto so as to overlay said hole in the body, and said body having an underside surface with an adhesive thereon; (ii) a carrier film having a hole therethrough and adhesive on at least a portion of an underside surface of the carrier film; and (iii) a plastic stand-off comprising an essentially flat portion with a plurality of protrusions projecting from a bottom surface of said flat portion, and a hole extending through said stand-off,
      wherein said check valve is affixed by said adhesive on said underside surface of said check valve to said carrier film, and said carrier film is affixed to said stand-off by said adhesive on said underside surface of the carrier film,
      wherein the hole in the check valve, the hole in the carrier film and the hole in the stand-off are in alignment with each other to provide an air passageway therethrough; and
      wherein said vacuum evacuation valve is adhesively affixed to said one wall panel having a hole therethrough of said compression storage bag so as to seal said hole and have said stand-off extending through said hole in said one wall panel and beyond said one wall panel into an interior space of said bag.

2. The portable container of claim 1 wherein said plastic stand-off is made of extruded plastic, embossed plastic, or cast formed plastic.

3. The portable container of claim 1 wherein said plastic stand-off has a rigidity sufficient to withstand collapse of the plastic stand-off under application of vacuum pressure.

4. The portable container according to claim 1 wherein said bag dimensions are in a range of about 18 inches by about 20 inches to about 35 inches to about 48 inches.

5. The portable container according to claim 1 wherein said at least two wall panels are made from plastic selected from the group consisting of polyethylene, polypropylene, nylon and bioplastics.

6. The portable container according to claim 1 wherein said vacuum evacuation valve is made from one or more plastics selected from a group consisting of polyethylene, polypropylene, nylon, and bioplastics.

7. The portable container according to claim 1 wherein said plastic stand-off is made of a plastic material selected from the group consisting of polyethylene, polypropylene, nylon and bioplastics.

8. The portable container according to claim 1 wherein said check valve is a label check valve.

9. The portable container according to claim 1 wherein said carrier film is affixed to an exterior surface of one of said at least two wall panels.

10. The portable container according to claim 1 wherein said carrier film further includes adhesive on at least a portion of a top side surface thereof and said vacuum evacuation valve is affixed to an interior surface of one of said at least two wall panels.

11. The portable container according to claim 1 wherein said protrusions of said stand-off are formed as ribs.

* * * * *